US012671569B2

(12) United States Patent
    Soriente et al.

(10) Patent No.: US 12,671,569 B2
(45) Date of Patent: Jun. 30, 2026

(54) USING LEVELED HOMOMORPHIC ENCRYPTION IN A CLIENT-SERVER SETTING FOR EVALUATING AN ARTIFICIAL NEURAL NETWORK OVER AN ENCRYPTED INPUT

(71) Applicant: NEC Laboratories Europe GmbH, Heidelberg (DE)

(72) Inventors: Claudio Soriente, Heidelberg (DE); Dario Fiore, Pozuelo de Alarcon (ES); Kasra Edalatnejadkhamene, Pozuelo de Alarcon (ES)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 18/718,442

(22) PCT Filed: Apr. 8, 2022

(86) PCT No.: PCT/EP2022/059455
    § 371 (c)(1),
    (2) Date: Jun. 11, 2024

(87) PCT Pub. No.: WO2023/110166
    PCT Pub. Date: Jun. 22, 2023

(65) Prior Publication Data
    US 2025/0055671 A1     Feb. 13, 2025

(30) Foreign Application Priority Data
    Dec. 14, 2021    (EP) ..................................... 21214516

(51) Int. Cl.
    *H04L 9/00*        (2022.01)
    *H04L 9/06*        (2006.01)
    *G06F 17/10*       (2006.01)

(52) U.S. Cl.
    CPC ............ *H04L 9/008* (2013.01); *H04L 9/0618* (2013.01); *G06F 17/10* (2013.01); *H04L 2209/46* (2013.01)

(58) Field of Classification Search
    CPC . H04L 9/008; H04L 9/0618; H04L 2209/046; G06F 17/10
    See application file for complete search history.

(56) References Cited

U.S. PATENT DOCUMENTS 9,094,378 B1 * 7/2015 Yung ....................... H04L 9/008
2011/0110525 A1    5/2011 Gentry
            (Continued)

FOREIGN PATENT DOCUMENTS

JP        2015503280 A     1/2015
JP        2019191575 A    10/2019
            (Continued)

OTHER PUBLICATIONS

Roy Sujoy Sinha et al: "Hardware Assisted Fully Homomorphic Function Evaluation and Encrypted Search", IEEE Transactions on Computers, IEEE, USA, vol. 66, No. 9, Sep. 1, 2017 (Sep. 1, 2017), pp. 1562-1572, XP011658956.
            (Continued)

*Primary Examiner* — Ellen Tran
(74) *Attorney, Agent, or Firm* — Leydig, Voit & Mayer, Ltd.

(57)                ABSTRACT
A computer-implemented method for performing at least one computational operation on an encrypted input by at least one processor of a server in a client-server setting, where parameters of the computational operation are private to the server and the input is private to the client is provided. The method includes receiving, by the server, a ciphertext c of a leveled homomorphic encryption (LHE) scheme as encrypted input. Randomness is homomorphically added by (Continued)

the server to the ciphertext c and the resulting ciphertext b is transmitted to the client. The server receives a refreshed ciphertext b' obtained by the client in a ciphertext refresh procedure including decrypting and re-encrypting the ciphertext b. The server homomorphically removes the previously added randomness from the received refreshed ciphertext b' to obtain a refreshed ciphertext c'. The server performs the at least one computational operation on the refreshed ciphertext c'.

18 Claims, 3 Drawing Sheets

(56) References Cited

U.S. PATENT DOCUMENTS

| | | | |
|---|---|---|---|
| 2013/0247230 A1 | 9/2013 | Parann-Nissany | |
| 2015/0358153 A1* | 12/2015 | Gentry | H04L 9/3093 380/30 |
| 2019/0327077 A1 | 10/2019 | Mandal | |
| 2020/0327250 A1 | 10/2020 | Wang | |
| 2021/0351913 A1 | 11/2021 | No et al. | |
| 2022/0224508 A1* | 7/2022 | Sirdey | G06F 21/6254 |

FOREIGN PATENT DOCUMENTS

| | | | |
|---|---|---|---|
| JP | 2021177239 A | 11/2021 | |
| JP | 2021179603 A | 11/2021 | |
| WO | WO-2021239006 A1 * | 12/2021 | G06F 21/602 |

OTHER PUBLICATIONS

Choudhury Ashish et al: "Between a Rock and a Hard Place: Interpolating between MPC and FHE", Dec. 1, 2013 (Dec. 1, 2013), SAT 2015 18th International Conference, Austin, TX, USA, Sep. 24-27, 2015; [Lecture Notes in Computer Science; Lect.Notes Computer], Springer, Berlin, Heidelberg, pp. 221-240, XP047452687.

Zhaomin Yang et al: "TOTA: Fully Homomorphic Encryption with Smaller Parameters and Stronger Security", IACR, International Association for Cryptologic Research, vol. 20211007:112843 Oct. 6, 2021 (Oct. 6, 2021), pp. 1-28, XP061068925.

Hernández Marcano Néstor J et al, "On Fully Homomorphic Encryption for Privacy-Preserving Deep Learning", 2019 IEEE Globecom Workshops (GC Wkshps), IEEE,Dec. 9, 2019 (Dec. 9, 2019), p. 1-6, XP033735230, US.

* cited by examiner

16

Client input: (a, a%sc, (a+q)%sc,r' )

Server input: (r, r%sc)

Server output: (Adj)

---

$C_1 = (a < r)$
$C_2 = (a\%sc < r\%sc)$
$C_3 = ((a+q)\%sc < r\%sc)$
$Err = (\neg C_1 \wedge C_2) \vee (C_1 \wedge C_3)$
$Adj = Err + (C_1 \wedge floor(q/sc))$
$C_4 = (q \leq Adj)$
$\mathbf{Adj} = Adj - (C_4 \wedge q)$

USING LEVELED HOMOMORPHIC ENCRYPTION IN A CLIENT-SERVER SETTING FOR EVALUATING AN ARTIFICIAL NEURAL NETWORK OVER AN ENCRYPTED INPUT

CROSS REFERENCE TO RELATED APPLICATIONS

This application is a U.S. National Phase application under 35 U.S.C. § 371 of International Application No. PCT/EP2022/059455, filed on Apr. 8, 2022, and claims benefit to European Patent Application No. EP 21214516.3, filed on Dec. 14, 2021. The International Application was published in English on Jun. 22, 2023 as WO 2023/110166 A1 under PCT Article 21(2).

FIELD

The present invention generally relates to the technical field of cryptology, in particular homomorphic encryption/decryption schemes, algorithms, techniques, methods, computer programs and apparatus. More specifically, embodiments of the present invention use Leveled Homomorphic Encryption (LHE) and provide a method for performing at least one computational operation on an encrypted input by at least one processor of a server in a client-server setting.

BACKGROUND

Leveled Homomorphic Encryption (LHE) enables the computation of arithmetic functions of bounded multiplicative complexity over encrypted data. LHE can, therefore, be used in client-server applications that use Artificial Neural Networks (ANNs) to classify a client's private input by using the server's private network. In a nutshell, the client encrypts its input under its own public key and sends the ciphertext to the server. The server homomorphically evaluates its private network over the client's encrypted input and returns the resulting ciphertext to the client. Finally, the client uses its private key to decrypt the ciphertext and obtains the classification result.

The issue with the blueprint just described is that homomorphic ciphertexts carry a noise component that grows at each homomorphic operation (additions or multiplications), and the ciphertext cannot be decrypted if its noise crosses a pre-defined threshold. This threshold may be defined when setting up a system, and it essentially sets an upper bound on the depth of the functions to be computed.

Unfortunately, setups with high noise thresholds may require very large ciphertexts that make the LHE scheme inefficient. For this reason, efficient LHE schemes can only compute functions of shallow depth and, therefore, cannot be used with deep ANNs.

Using LHE to evaluate functions of high multiplicative depth, including deep ANNs, may require means to keep the noise of ciphertext low throughout the computation. Existing techniques to reduce the noise in a ciphertext fall in two categories. One option is called ciphertext refresh: the holder of the decryption key decrypts a ciphertext resulting from intermediate computation and re-encrypts it in a new ciphertext with fresh noise; nevertheless the plaintext value obtained via decryption may leak details of the function being computed to the party holding the secret key and is not viable in ANN applications where the network parameters are private to the server. The other option is to use a technique called bootstrapping that is essentially inefficient.

Further, most LHE schemes allow computation over integers whereas ANN applications compute on real-valued data. Fixed-point representation is the common solution to handle real-valued data with encryption schemes that work on integers. Nevertheless, the scaling factor of fixed-point representations increases at every multiplication. Hence, when defining the encryption scheme parameters, the plaintext and ciphertext sizes may be chosen to accommodate for the (maximum) size of the scaling factor. As with the noise, a large scaling factor may require large ciphertexts that make the encryption scheme inefficient.

SUMMARY

In an embodiment, the present disclosure provides a computer-implemented method for performing at least one computational operation on an encrypted input by at least one processor of a server in a client-server setting, wherein the parameters of the computational operation are private to the server and the input is private to the client, the method comprising: receiving, by the server, a ciphertext c of a leveled homomorphic encryption (LHE) scheme as encrypted input; homomorphically adding, by the server, randomness to the ciphertext c and transmitting the resulting ciphertext b to the client; receiving, by the server, a refreshed ciphertext b' obtained by the client in a ciphertext refresh procedure including decrypting and re-encrypting the ciphertext b; homomorphically removing, by the server, the previously added randomness from the received refreshed ciphertext b' to obtain a refreshed ciphertext c'; and performing, by the server, the at least one computational operation on the refreshed ciphertext c'.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
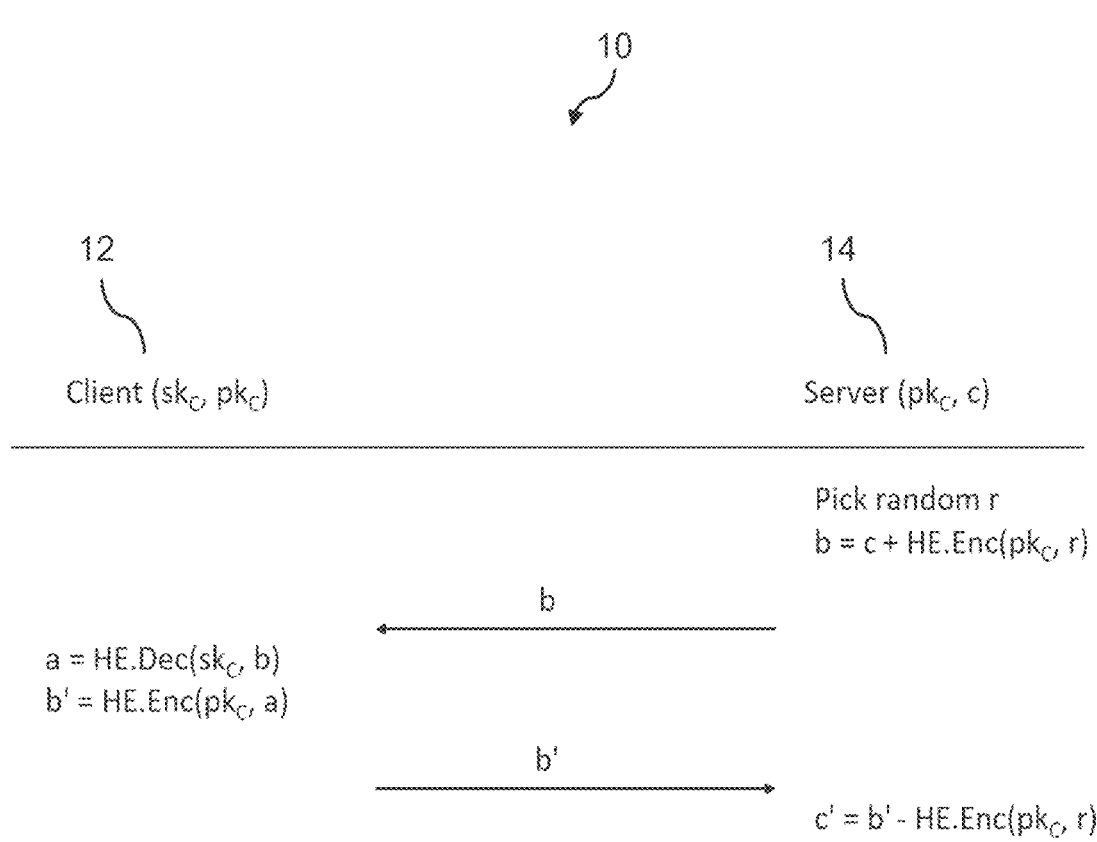
FIG. 1 is a diagram illustrating an LHE scheme in a client-server scenario using blinded ciphertext refreshing in accordance with a first embodiment of the present invention.

In accordance with an embodiment, the present invention improves and further develops a method of the initially described type in such a way that the efficiency of the encryption scheme is enhanced and by ensuring that no private information is leaked between the client and the server.

In accordance with another embodiment, the present invention provides a computer-implemented method for performing at least one computational operation on an encrypted input by at least one processor of a server in a client-server setting, wherein the parameters of the computational operation are private to the server and the input is private to the client, the method comprising: receiving, by the server, a ciphertext c of a leveled homomorphic encryption, LHE, scheme as encrypted input; homomorphically adding, by the server, randomness to the ciphertext c and transmitting the resulting ciphertext b to the client; receiving, by the server, a refreshed ciphertext b' obtained by the client in a ciphertext refresh procedure including decrypting and re-encrypting the ciphertext b; homomorphically removing, by the server, the previously added randomness from the received refreshed ciphertext b' to obtain a refreshed ciphertext c'; and performing, by the server, the at least one computational operation on the refreshed ciphertext c'.

Furthermore, in accordance with another embodiment, the present invention provides a device for a server in a client-server setting and a non-transitory computer-readable storage medium as specified in the independent claims.

The present invention proposes a ciphertext refreshing technique that enhances ciphertext refreshing with a randomness-based blinding aspect to enable the holder of the decryption key to reduce the noise of a ciphertext without learning its plaintext value. More specifically, the present invention uses Leveled Homomorphic Encryption (LHE) to enable performing complex computational operation on an encrypted input, for instance classification with deep Artificial Neural Networks (ANNs), in a client-server application scenario where the input is private to the client and the network parameters are private to the server. As explained above, state-of-the-art techniques that use LHE for ANNs applications either incur in high computational overhead or can only accommodate shallow networks. The current invention introduces a novel interactive bootstrapping using leveled homomorphic encryption that enables the use of deep networks and the computation of functions of arbitrary depth without high overhead, while ensuring that ciphertext refresh operations leak no information on the intermediate computations. It should be noted that using a leveled homomorphic encryption scheme without bootstrapping, would either limit the multiplicative depth of the functions that can be computed (e.g., the depth of an ANN) or increase the complexity of the homomorphic operations (i.e., running time at the server).

The term 'bootstrapping' as used in the present disclosure essentially refers to decrypting the ciphertext to obtain a message m and re-encrypting the message m in a fresh ciphertext. The rationale is that fresh ciphertexts have low noise and can be combined with other ciphertexts or constants with additions/multiplications. At each operation, the noise of the ciphertext grows and if the noise level grows beyond a threshold value, decryption is no longer possible. Hence, to perform "many" operations on a ciphertext while retaining the ability to decrypt the result, one has to carry out bootstrapping every few operations.

According to an embodiment of the present invention, the at least one computational operation may include evaluating an Artificial Neural Network, ANN, over the encrypted input. As such, in an embodiment the present invention provides a method for evaluating an ANN over an encrypted input by using an LHE scheme in a client-server scenario, where the ANN is private to the server and the ciphertext encrypting the input is private to the client, the method comprising the steps of 1) Homomorphically adding, by a server, randomness to a ciphertext of a leveled homomorphic encryption scheme;

2) Decrypting and re-encrypting, by a client, the ciphertext of step 1; and

3) Homomorphically removing, by the server, the randomness of step 1 from the ciphertext of step 2.

The above method adds randomness to a ciphertext of the LHE scheme before the refresh operations, so that the party carrying out the refresh operation learns nothing about the plaintext encrypted in the ciphertext being refreshed.

As will be appreciated by those skilled in the art, beyond ANNs, the distributed technique to refresh a ciphertext as disclosed herein (as well as the distributed technique to re-scale fixed-point representations of plaintext data, as will be described in detail below) is applicable to a broader context of computation over encrypted data. In particular, the techniques may be applied in connection with a variety of IoT solutions, for instance in applications where a server device remotely controls or manages a client device. In such cases, since the method according to the present invention may require multiple communication rounds between client and server, stable and reliable communication links between the devices would be advantageous.

According to an embodiment of the invention, the step of homomorphically adding randomness to the ciphertext c may be executed as follows: The server may select a random element r and may encrypt the selected random element r under the public key $pk_c$ of the client using the encryption operation of the LHE scheme (generally denoted HE.Enc herein). Finally, the server may homomorphically add the resulting ciphertext HE.Enc($pk_c$, r) to the ciphertext c.

According to an embodiment of the invention, the step of homomorphically removing the previously added randomness from the received ciphertext b' may be executed as follows: The server may homomorphically subtract the encryption of r encrypted under the public key $pk_c$ of the client from the ciphertext b' received from the client.

According to an embodiment of the invention, to make the encryption scheme efficient and to enable real-valued computations with LHE schemes that only support integers, the ciphertext refreshing technique may be enhanced with a re-scaling operation that allows to reduce the scaling factor and to evaluate deep ANNs with encryption schemes that use fixed-point representation of plaintext data. More specifically, it may be provided that a scale factor of a fixed-point plaintext encrypted in a ciphertext of the LHE scheme is reduced by means of applying a re-scaling operation that discards a predefined amount of the least significant bits of the fixed-point plaintext. According to an embodiment of the invention, the re-scaling operation may be carried out based on the floor ( ) function that discards the decimal part of its input value.

According to an embodiment of the invention, it may be provided that errors incurred by the re-scaling operation (in particular, a modular reduction error and an approximation error) are corrected by using a multi-party computation, MPC, protocol between the client and the server.

According to an embodiment of the invention, in order to enable computational negative numbers, it may be provided that ones' complement encoding is used and a plaintext value x is represented as N+x for a fixed N.

There are several ways how to design and further develop the teaching of the present invention in an advantageous way. To this end, it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

FIG. 1 shows an embodiment of the present invention that implements an LHE (Leveled Homomorphic Encryption) scheme in a client-server scenario 10, wherein blinded ciphertext refreshing is used. In the embodiment depicted in FIG. 1, HE.Enc and HE.Dec denote the encryption and decryption algorithms, respectively.

According to FIG. 1, the client 12 holds a key-pair ($sk_c$, $pk_c$) of the LHE scheme, whereas the server 14 only holds the public key $pk_c$. Also, the server 14 holds a ciphertext c of data x encrypted under the public key $pk_c$ of the client 12. It is assumed that c is the outcome of a homomorphic computation carried out by the server 14 over ciphertext(s) encrypted under the public key $pk_c$ of the client 12.

In accordance with an embodiment of the present invention, in order to refresh ciphertext c without revealing x to the client 12, the server 14 is configured to do the following: The server 14 may pick a random element r, encrypt it under the public key $pk_c$ of the client 12 and homomorphically add the resulting ciphertext HE.Enc($pk_c$, r) to c:

$$b = c + HE.Enc(pk_c, r).$$

The resulting ciphertext b is an encryption of x+r under the public key $pk_c$ of the client 12. The server 14 transmits the resulting ciphertext b to the client 12.

Upon receipt of b, the client 12 carries out a regular noise refreshing procedure, that is, it decrypts the ciphertext b received from the server 14 by using its secret key $sk_c$ to obtain plaintext a:

$a=HE.Dec(sk_c,b).$

Next, the client 12 re-encrypts the obtained plaintext a by using its public key $pk_c$:

$b'=HE.Enc(pk_c,a).$

The resulting ciphertext—denoted by b'—encrypts the same plaintext of the ciphertext sent by the server 14 (that is, x+r), but with reduced noise.

The client 12 sends the new ciphertext b' to the server 14. Finally, upon receipt of b', the server 14 homomorphically subtracts the encryption of r (encrypted under the public key $pk_c$ of the client 12) from the ciphertext b' received from the client 12:

$$c' = b' - HE.Enc(pk_c, r).$$

As a result, the server 14 obtains a-refreshed-ciphertext c' that encrypts x under the public key $pk_c$ of the client 12. The ciphertext c' can then be used (instead of the previous ciphertext c) for further computation, e.g. in a machine learning application, such as an ANN.

The majority of machine learning applications operate on real numbers, whereas popular homomorphic encryption schemes like BFV (Brakerski/Fan-Vercauteren), for reference, see Junfeng Fan and Frederik Vercauteren, Somewhat Practical Fully Homomorphic Encryption. https://eprint.i-acr.org/2012/144, only supports integer arithmetic in $Z_q$. A common approach to represent real numbers with integers is using fixed-point notation which sets a scale s for each value x and interprets the pair (x, s) as $x*2^{-s}$.

The fixed-point notation is compatible with homomorphic encryption schemes such as BFV. In particular, one may set a public scale s as a fixed parameter and all homomorphic operations may take into account this public scaling factor. For example, adding two (encrypted) operands that share the same scale has no impact on the precision. In contrast, the multiplication algorithm does not require the two operands to have the same scale, but it increases the scale of the output. That is, the multiplication of two operands (x,s) and (x',s') results in (x*x,s+s'). In general n multiplications of operands with scale s result in a scale of n*s. When using homomorphic encryption schemes like BFV, one has to account for the growth of the scale factor at each multiplication. However, allocating representation bits for the scale results in larger ciphertexts that, in turn, increase the computational complexity of the scheme.

A common approach to address the issue of a growing scale due to multiplications is to provide a re-scaling procedure which reduces the scale of a value by discarding the least significant bits. In particular, the rescaling operation of value $x*2^{-s}$ with rescaling factor $sc=2^{rs}$ is carried out by computing floor $(x/sc)*2^{-(s-rs)}$, where floor( ) is the function that discards the decimal part of the input value. Unfortunately, the division operation is not compatible with the homomorphic scheme. To solve this challenge and enable float computations, embodiments of the present invention provide a method that enhances a refreshing protocol, for instance the refreshing protocol described above in connection with FIG. 1, to rescale ciphertexts in addition to refresh their noise.

For instance, in the ciphertext refresh protocol of FIG. 1, the value to be refreshed (i.e., x) is blinded with randomness r. Hence, according to an embodiment of the present invention it may be provided to carry out the division floor (x/sc) by splitting it in two parts, that is to compute floor (x+r/sc) and floor (r/sc). In this context, it should be noted that x+r is known to the client 12 and r is known to the server 14, so each party can apply the rescaling operation over plaintext data.

Nevertheless, rescaling at the client 12 can incur in two types of error. The first possible error is a modular reduction error due to the fact that the plaintext obtained via decryption, denoted by a in FIG. 1, is x+r mod q. Since both x and r lie in $Z_q$, then it may be either a=x+r or a=x+r−q, depending on whether x+r<q or x+r≥q. The second error is an approximation error because floor (x+r/sc) may be different from floor (x/sc)+floor (r/sc). This is because when dividing x and r by sc, each division will produce a remainder and, if the sum of the remainders is greater than sc, then floor (x/sc)=(floor((x+r)/sc)−floor(r/sc))−1.

Figure 2:
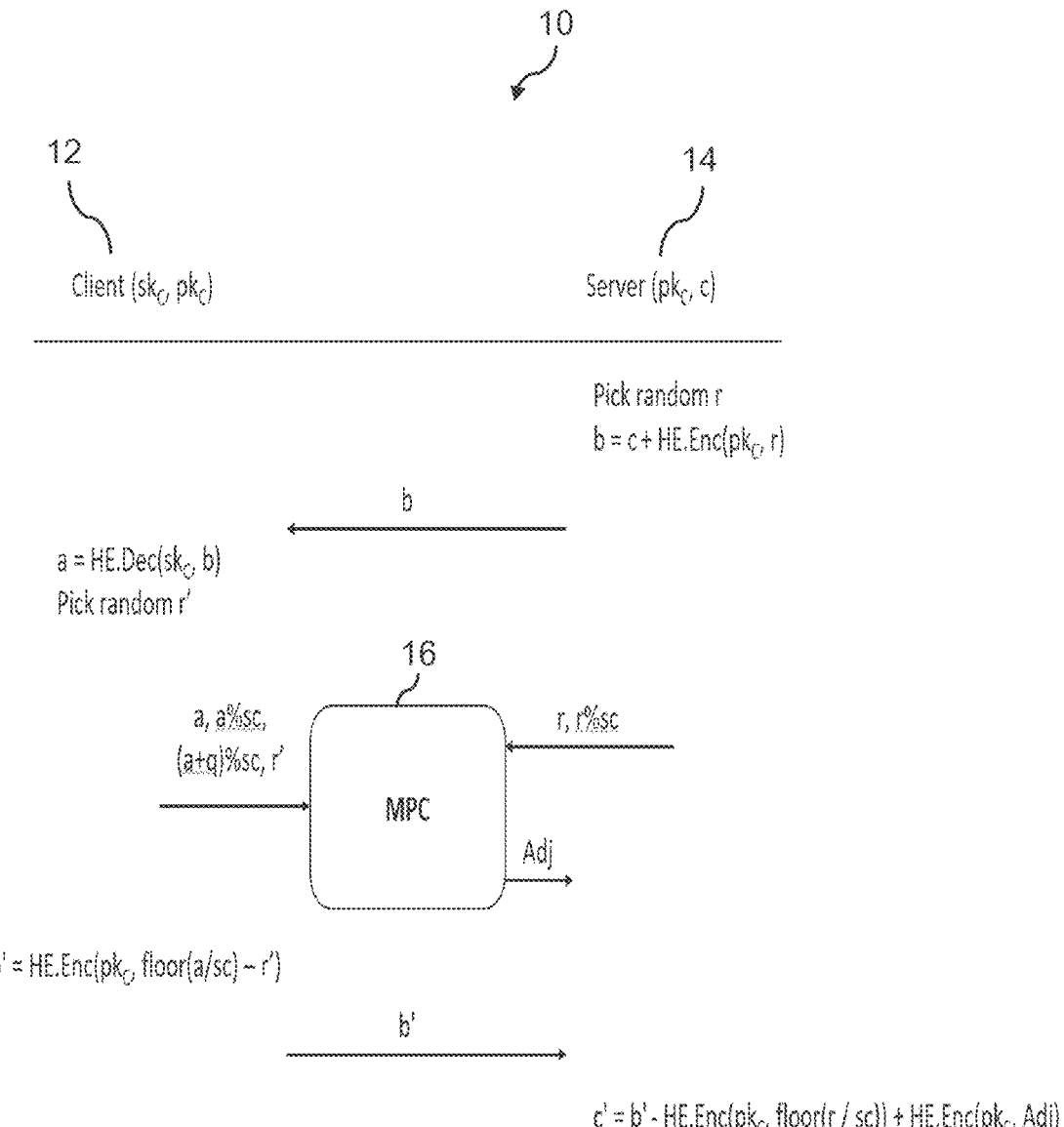
FIG. 2 is a diagram illustrating an alternative refreshing protocol enhanced with a ciphertext re-scaling procedure based on a multi-party computation (MPC) protocol in accordance with an embodiment of the present invention.

According to embodiments of the present invention, a secure multi-party computation, MPC, protocol 16 is used to correct both errors, as shown in FIG. 2.

Correcting modular reduction. In an embodiment, the client 12 assumes that x+r<q (so that a=x+r) and computes floor (x+r/sc) as floor (a/sc). Next, the client 12 and the server 14 use an MPC protocol 16 to verify if the client's 12 assumption were true. In case the assumption were false, then the client 12 adds q/sc to the result.

Correcting approximation error. In an embodiment, the same MPC protocol 16 may be used to compute the error correction for both the case of x+r=a and x+r=a+q. In particular, the error correction may be computed from (x+r) % sc (which is known by the client 12) and r % sc (which is known by the server 14). Here, the expression x % y denotes the remainder of x divided by y.

Figure 3:
FIG. 3 is a diagram illustrating details of the MPC protocol used in the embodiment of FIG. 2.

Details of the MPC protocol 16 according to embodiments of the present invention are depicted in FIG. 3. As shown, the client's 12 private inputs are a, a % sc, (a+q) % sc and r'. The server's 14 private inputs are r and r % sc. Here, r, r' are random blinding factors. The server 14 receives—as the only party—as output Adj as a compensation for the error made by the client 12 when rescaling.

According to an embodiment, the functionality of the MPC 16 may compute the Adj as follows. First, it checks whether a<r (condition $C_1$ in FIG. 3). If this condition is true, then the compensation may include floor (q/sc). Next, it computes the compensation for the approximation error in case a=x+r (condition $C_2$) or in case a+q=x+r (condition $C_3$). Finally, it decides which compensation to output based on whether a=x+r or a+q=x+r (Condition $C_4$). Condition $C_4$ determines whether (0<=Adj<q) or (q<=Adj<2q) and the MPC applies mod q by reducing q from Adj when the overflow happens.

Handling Negative Numbers. The fixed-point representation enables computation over positive float numbers. In order to allow computation on negative numbers, embodiments of the present invention use a variant of ones' complement encoding and represent the value x as N+x for a fixed N. In an embodiment, N is chosen as the power of 2 which is closest to q/2. This leads to an effective range of [−N, q−N) for x in $x*2^{-s}$. This encoding has no impact on the rescaling protocol as 1) both positive and negative numbers have the same division procedure, and 2) since N is chosen as the highest power of 2 in [0,q], the remainder of N % sc is guaranteed to be zero.

The ones' complement encoding according to the above embodiment is compatible with the ciphertext refreshing technique as disclosed herein and may require no change to the MPC protocol 16 as described above. However, the addition of bias N leads to requiring a fixed correction term for all homomorphic operations. Table 1 shows the naive result of operations on inputs (x+N) and (y+N) and their correction terms. As the scale has no impact on this computation, it is omitted for simplicity.

TABLE 1

| | Naive Result | Desired | Correction |
|---|---|---|---|
| Addition | x + y + 2N | (x + y) + N | −N |
| Subtraction | x − y | (x − y) + N | +N |
| Multiplication | xy + Nx + Ny + $N^2$ | (x*y) + N | $-N(x + N) - N(y + N) + N^2$ |
| Division by scalar s | floor(x/s) + N/s | floor(x/s) + N | +N − N/s |

Computing and adding the correction term shown in Table 1 is straightforward. The complexity of computing and applying the correction is lower than the original operation as scalar multiplication is used for cipher to cipher multiplications and scalar addition is used for the rest of the operations. This ensures that the extra overhead of ones' complement operation correction is not significant.

It should be noted that the choice of ones' complement encoding for homomorphic encryption is uncommon. However, in accordance with embodiments of the present invention, it has been recognized that the ubiquitous encoding of HE schemes, which directly map [0, q) to [−q/2,q/2) based on their modulus q remainder, may require different division procedures for positive and negative numbers and is incompatible with the rescaling protocol disclosed herein. Therefore, the encoding according to embodiments of the present invention provides higher overall efficiency despite requiring a homomorphic correction in the end.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for performing at least one computational operation on an encrypted input by at least one processor of a server in a client-server setting, wherein parameters of the computational operation are private to the server and the input is private to the client, the method comprising:

receiving, by the server, a ciphertext c of a leveled homomorphic encryption (LHE) scheme as encrypted input;

homomorphically adding, by the server, randomness to the ciphertext c and transmitting the resulting ciphertext b directly to the client;

receiving, by the server directly from the client, a refreshed ciphertext b' obtained by the client in a ciphertext refresh procedure including decrypting and re-encrypting the ciphertext b;

homomorphically removing, by the server, the previously added randomness from the received refreshed ciphertext b' to obtain a refreshed ciphertext c'; and performing, by the server, the at least one computational operation on the refreshed ciphertext c'.

2. The method according to claim 1, wherein the at least one computational operation includes evaluating an Artificial Neural Network (ANN) over the encrypted input.

3. The method according to claim 1, wherein homomorphically adding randomness to the ciphertext c comprises:
  selecting, by the server, a random element r;
  encrypting, by the server, the selected random element r under a public key $pk_c$ of the client using the encryption operation HE.Enc of the LHE scheme; and
  homomorphically adding the resulting ciphertext HE.Enc $(pk_c, r)$ to the ciphertext c.

4. The method according to claim 3, wherein homomorphically removing the previously added randomness from the received ciphertext b' comprises:
  homomorphically subtracting, by the server, the encryption of r encrypted under the public key $pk_c$ of the client from the ciphertext b' received from the client.

5. The method according to claim 1, further comprising:
  reducing a scale factor of a fixed-point plaintext encrypted in a ciphertext of the LHE scheme by applying a re-scaling operation that discards a predefined amount of least significant bits of the fixed-point plaintext.

6. The method according to claim 5, wherein the re-scaling operation is carried out based on a floor function that discards a decimal part of an input value.

7. The method according to claim 5, further comprising:
  using a multi-party computation (MPC) protocol between the client and the server to correct errors incurred by the re-scaling operation.

8. The method according to claim 1, further comprising:
  using ones' complement encoding and representing a plaintext value x as N+x for a fixed N to enable computation on negative numbers.

9. The method according to claim 1, wherein homomorphically adding the randomness to the ciphertext c is performed using a public key $pk_c$ of the client.

10. The method according to claim 1, wherein homomorphically removing the previously added randomness is performed using a public key $pk_c$ of the client.

11. The method according to claim 1, wherein the server only has a public key $pk_c$ of the client, and wherein the client has the public key $pk_c$ and a secret key $sk_c$.

12. A device for a server in a client-server setting, the device comprising one or more processors and a memory, the memory comprising processor executable instructions that, when executed by one or more of the processors, cause the one or more processors, alone or in combination, to perform a method for performing at least one computational operation on an encrypted input, wherein parameters of the computational operation are private to the server and the input is private to the client, the method comprising:
  receiving a ciphertext c of a leveled homomorphic encryption (LHE) scheme as encrypted input;

homomorphically adding randomness to the ciphertext c and transmitting the resulting ciphertext b directly to the client;
  receiving, directly from the client, a refreshed ciphertext b' obtained by the client by decrypting and re-encrypting the ciphertext b;
  homomorphically removing the previously added randomness from the received refreshed ciphertext b' to obtain a refreshed ciphertext c'; and
  performing the at least one computational operation on the refreshed ciphertext c'.

13. The device according to claim 12, wherein the at least one computational operation includes evaluating an Artificial Neural Network (ANN) over the encrypted input.

14. The device according to claim 12, wherein homomorphically adding randomness to the ciphertext c comprises:
  selecting, by the server, a random element r;
  encrypting, by the server, the selected random element r under a public key $pk_c$ of the client using the encryption operation HE.Enc of the LHE scheme; and
  homomorphically adding the resulting ciphertext HE.Enc $(pk_c, r)$ to the ciphertext c.

15. The device according to claim 14, wherein homomorphically removing the previously added randomness from the received ciphertext b' comprises:
  homomorphically subtracting, by the server, the encryption of r encrypted under the public key $pk_c$ of the client from the ciphertext b' received from the client.

16. A non-transitory computer-readable storage medium comprising computer-executable instructions that, when executed by one or more processors of a server in a client-server setting, result in operations comprising:
  receiving a ciphertext c of a leveled homomorphic encryption scheme as encrypted input;
  homomorphically adding randomness to the ciphertext c and transmitting the resulting ciphertext b directly to the client;
  receiving, directly from the client, a refreshed ciphertext b' obtained by the client by decrypting and re-encrypting the ciphertext b;
  homomorphically removing the previously added randomness from the received refreshed ciphertext b' to obtain a refreshed ciphertext c'; and
  performing at least one computational operation on the refreshed ciphertext c'.

17. The storage medium according to claim 16, wherein the at least one computational operation includes evaluating an Artificial Neural Network (ANN) over the encrypted input.

18. The storage medium according to claim 16, wherein a scale factor of a fixed-point plaintext encrypted in a ciphertext of the LHE scheme is reduced by applying a re-scaling operation that discards a predefined amount of least significant bits of the fixed-point plaintext.

* * * * *